US010578164B1

(12) United States Patent
Zhong

(10) Patent No.: US 10,578,164 B1
(45) Date of Patent: Mar. 3, 2020

(54) BEARING HAVING INTEGRATED SOFT CONNECTED GROUNDING DEVICE

(71) Applicant: SCHAEFFLER TECHNOLOGIES AG & CO. KG, Herzogenaurach (DE)

(72) Inventor: Guihui Zhong, Charlotte, NC (US)

(73) Assignee: SCHAEFFLEER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/142,104

(22) Filed: Sep. 26, 2018

(51) Int. Cl.
F16C 19/52 (2006.01)
F16C 41/00 (2006.01)
F16C 19/06 (2006.01)
F16C 33/66 (2006.01)

(52) U.S. Cl.
CPC ............ F16C 41/002 (2013.01); F16C 19/06 (2013.01); F16C 33/6614 (2013.01)

(58) Field of Classification Search
CPC ...... F16C 19/06; F16C 19/52; F16C 33/6614; F16C 33/6651; F16C 41/002
See application file for complete search history.

(56) References Cited

U.S. PATENT DOCUMENTS

| 3,271,723 | A | 9/1966 | Willing |
| 3,564,477 | A | 2/1971 | Pompei |
| 4,801,270 | A | 1/1989 | Scarlata |
| 6,027,188 | A | 2/2000 | Nickens |
| 6,755,572 | B1* | 6/2004 | Kinbara ................. F16C 19/52 384/462 |
| 7,339,777 | B2 | 3/2008 | Barnard et al. |
| 9,175,728 | B2 | 11/2015 | White |
| 9,488,225 | B2* | 11/2016 | Sekimoto ............ F16C 33/6651 |
| 2015/0355075 | A1* | 12/2015 | Murray ............... G01M 13/045 384/448 |

FOREIGN PATENT DOCUMENTS

JP 2004162909 A * 6/2004 ............. F16C 13/02

* cited by examiner

Primary Examiner — Phillip A Johnson
(74) Attorney, Agent, or Firm — Brooks Kushman P.C.

(57) ABSTRACT

A bearing includes an inner ring defining an inner raceway, an outer ring defining an outer raceway, and a plurality of rolling elements contacting the inner raceway and the outer raceway to enable relative rotation between the inner ring and the outer ring. A connecting ring is radially between and contacts the inner ring and the outer ring. A chamber is bound at least partially by the connecting ring and one of the two rings. The chamber is at least partially filled with a conductive grease or lubricant to enable electric current to travel between the outer ring and the inner ring at the connecting ring.

14 Claims, 4 Drawing Sheets

US 10,578,164 B1

BEARING HAVING INTEGRATED SOFT CONNECTED GROUNDING DEVICE

TECHNICAL FIELD

The present disclosure relates to a bearing configured to safely transfer or ground electrical current that may travel through the bearing. More specifically, this disclosure relates to a bearing with a soft connected grounding device integrated into the bearing.

BACKGROUND

Certain types of bearings are known to have an inner ring rotatably coupled to an outer ring by a plurality of rolling elements or rollers, such as balls. The balls allow one ring of the bearing to rotate relative to the other ring of the bearing.

Bearings may be used in high speed spindle applications, such as in electric motors and generators. Electrical currents may, at times, pass through the bearing, which can cause damage to the rings or the rollers. To help prevent this type of damage, an insulator may be provided (such as utilizing a ceramic rolling element or an insulation coating), or an integrated conductive wire (such as carbon fibers) can connect the inner and outer raceways through hard contact for grounding.

SUMMARY

In one embodiment, a bearing includes an inner ring defining an inner raceway, and an outer ring defining an outer raceway. A roller assembly includes a plurality of rolling elements contacting the inner raceway and the outer raceway to enable relative rotation between the inner ring and the outer ring. A connecting ring is radially between and contacts the inner ring and the outer ring, wherein the connecting ring is axially spaced from the roller assembly. A chamber is bound at least partially by the connecting ring, wherein the chamber is at least partially filled with a conductive grease or lubricant to enable electric current to travel between the outer ring and the inner ring at the connecting ring.

In another embodiment, a bearing includes an inner ring defining an inner raceway, and an outer ring defining an outer raceway. A roller assembly has a plurality of rolling elements contacting the inner raceway and the outer raceway to enable relative rotation between the inner ring and the outer ring. An isolated fluid chamber contains a conductive grease or lubricant, wherein the conductive grease or lubricant is configured to divert or discharge electrical current traveling through the bearing at a location removed from the rolling elements and the inner and outer raceways.

In yet another embodiment, a bearing includes an inner race, an outer race spaced radially from the inner race, a groove surface formed into at least one of the races, a connecting ring disposed radially between the inner race and the outer race, and a conductive fluid disposed radially between the connecting ring and the groove surface.

DETAILED DESCRIPTION

Figure 1:
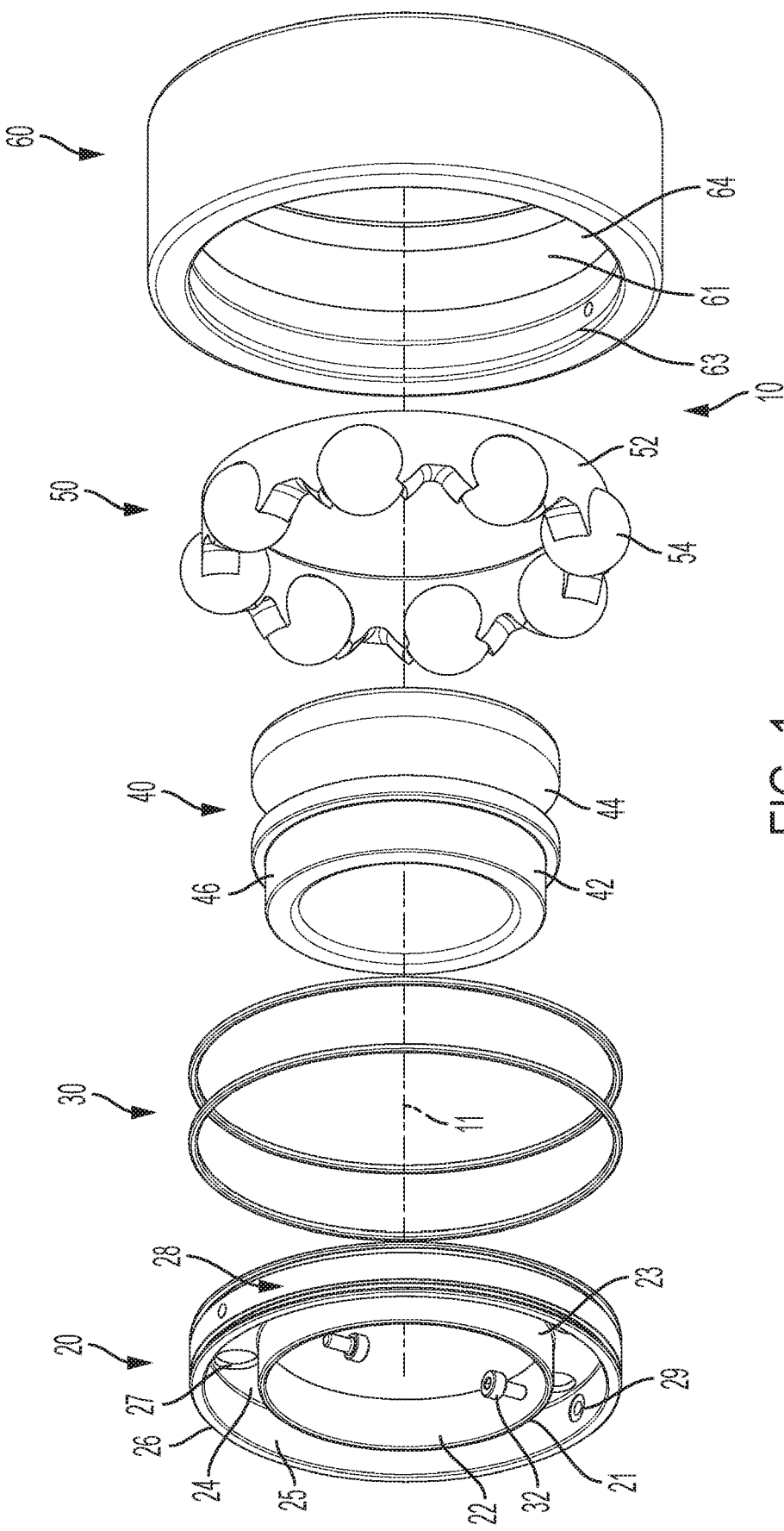
FIG. 1 is an exploded perspective view of a bearing with an integrated soft connected grounding device including an isolated chamber having a conductive fluid therein, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surface faces away from the central axis, or is outboard of another "inner" surface. Terms such as "radial," "diameter," "circumference," etc. also are relative to the central axis. The term "axial" can mean extending along the center axis, or extending in a direction parallel to the center axis. The term "radial" can mean a direction perpendicular to the axial direction. The term "circumferential" can mean a direction about the axis, like a circumference of a circle.

Bearings may be used in high speed spindle applications, such as in electric motors and generators. The bearing of this disclosure can be used in these settings, such as hybrid transmissions or e-axle applications. Electrical currents may, at times, pass through the bearing, which can cause damage to the rings or the rollers. It may be advantageous to divert the electrical currents so that they do not pass through certain components such as the rolling elements. The bearing of the present disclosure provides an electrical pathway to release or ground the electrical charges while diverting the charge from the rolling elements themselves. The discharge of the current can occur at a location removed or separate from the rolling elements and their associated raceways, thereby protecting the raceways and rolling elements from discharge damage. The discharge may occur through a conductive grease or lubricant sealed between the bearing inner ring and outer ring that is separate from the bearing lubricant, allowing the electrical charge to pass from the inner ring to the outer ring via the conductive grease, or vice versa, without transferring through the raceways or rolling elements. This can hereinafter be referred to as an integrated soft connected grounding device (ISCGD) in the bearing.

Figure 2:
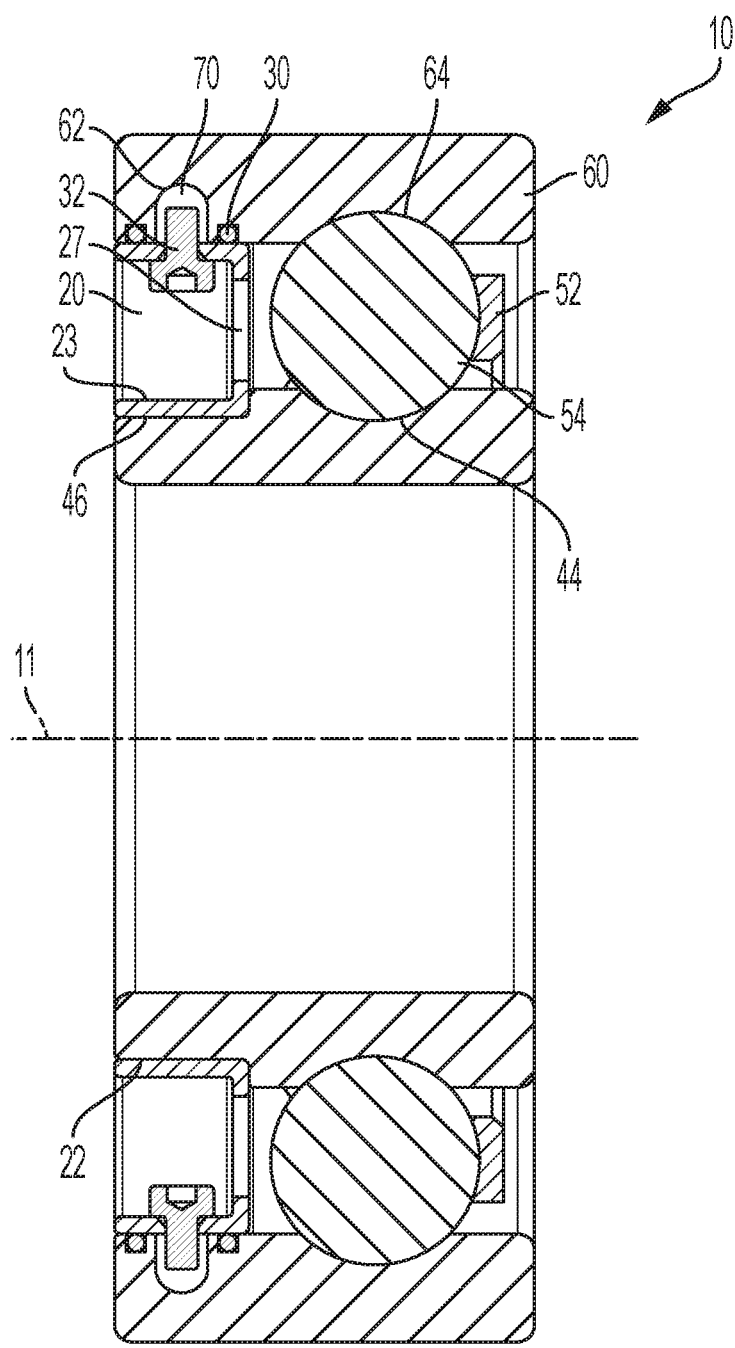
FIG. 2 is a cross-sectional view of the bearing of FIG. 1 in an assembled configuration, according to one embodiment.

FIGS. 1-2 illustrates such a bearing according to one embodiment, in which FIG. 1 illustrates a perspective exploded view and FIG. 2 illustrates a cross-sectional view of a bearing 10. The bearing 10 has various components extending about a central axis 11, including a connecting ring 20, one or more seals 30, an inner ring 40, a roller assembly 50, and an outer ring 60. These components are described in more detail below.

Referring to the embodiment of FIGS. 1-2, the inner ring 40 defines an inner surface 41 extending about the axis 11, and a corresponding outer surface 42. The outer surface 42 includes or defines an inner raceway 44 for the rolling elements of the roller assembly 50. Likewise, the outer ring 60 includes an inner surface 61 extending about axis 11. The inner surface 61 includes or defines an outer raceway 64 for the rolling elements. The roller assembly 50 includes a bearing cage 52 and a plurality of rolling elements 54 such as spherical balls 56. The cage 52 interconnects the balls 56 while allowing rotation of the balls 56 within a respective pocket of the cage 52. During operation, the cage 52 is able to rotate about the center axis 11 while the balls contact the inner and outer raceways 44, 64, traveling circumferentially between the raceways. This allows for relative movement between the inner ring 40 and the outer ring 60.

The connecting ring 20 connects the inner ring 40 to the outer ring 60. In particular, the connecting ring 20 includes an inner hub 21 having an inner surface 22 that contacts a corresponding shoulder 46 of the outer surface 42 of the inner ring 40. An interference fit may be provided radially between the connecting ring 20 and the shoulder 46 to allow the inner ring 40 and the connecting ring 20 to establish good contact and allow electrical charges to pass through. The inner surface 22 can be in a press-fit with the outer surface 42. The inner hub 21 also has an outer surface 23 that intersects an axial surface 24 that extends radially outward from the outer surface 23 of the inner hub 21 to an inner surface 25 of an outer annular member 26 of the connecting ring 20. The axial surface 24 defines one or more apertures 27 for allowing automatic transmission fluid (ATF) or lubricant to pass through. In one embodiment, eight equally-spaced apertures 27 are provided for transfer of the ATF and also for weight reduction. The fluid can pass between and amongst the rolling elements 56 and raceways 44, 64, and into a fluid chamber or pocket in the connecting ring 20, between the inner hub 21 and the outer annular member 26.

The bearing of this disclosure includes a separate fluid chamber for containing a conductive grease or lubricant that is fluidly separated from the ATF or lubricant that passes through the bearing. For example, in the illustrated embodiment, a separate fluid chamber 70 is bound radially between the connecting ring 20 and the outer ring 60. The seals 30 are disposed on either axial side of the chamber 70 to contain the conductive grease or lubricant in the chamber 70. The seals 30 may be rubber or other synthetic material capable of deflection to properly seal the chamber 70 while enabling rotation of the outer ring 60 relative to the connecting ring 20.

The chamber 70 is partially bound by an annular groove 28 in the outer surface of the connecting ring 20. The chamber 70 is also partially bound by a grooved surface that defines an annular groove 62 extending radially outwardly from the shoulder 63 of the outer ring 60. The outer surface of the connecting ring 20 includes one or more filling holes 29. The filling holes 29 can be situated axially between the tracks or grooves in which the seals 30 rest against the connecting ring 20. The filling holes 29 are configured to provide a port for filling the chamber 70 with the conductive fluid or grease. A corresponding number of fasteners such as plugs or screws 32 can engage the connecting ring 20 through the filling holes 29 to close the filling holes 29 and contain the conductive fluid within the chamber 70. The screws 32 may have threads to allow an assembler to tighten the screw to the connecting ring 20, but in other embodiments the screws do not have threads and are merely plugs. A small O-ring may be provided around the plug to further seal the engagement between the screw 32 and the connecting ring 20. When assembled, the screw 32 provides another point of contact between the connecting ring 20 and the conductive fluid within the chamber 70. This provides another concentrated region where electric current can be diverted, through physical interaction between the screw 32 and the connecting ring 20. As such, it may be preferential for the screw to be metal, such as steel.

During assembly, the seals 30 are assembled to the connecting ring 20 on either side of the groove 28. The connecting ring 20 is pressed onto the inner ring 40 until the connecting ring is stopped by the end of the shoulder 46 of the inner ring 40 (e.g., the connecting ring 20 is pressed to the right in the orientation shown in FIG. 2). The outer ring 40 is fitted over the connecting ring 20 and the seals 30. With the groove 28 of the connecting ring 20 aligned with the groove 62 of the outer ring 60, the chamber 70 is formed between the connecting ring 20 and the outer ring 60. The chamber 70 may be filled with the conductive grease or lubricant through the filling holes 29, and then may be closed by screws 32. The conductive grease or lubricant is thus contained within the chamber 70, fluidly isolated from the other lubricant (e.g., ATF) within the bearing, e.g., the lubricant contacting the roller assembly 50. It may be desirable to reduce the drag associated with the connecting between the seals 30 and the outer ring 60 to enable the outer ring 60 to slide along the seals 30 during rotation relative to the connecting ring 20. Therefore, the amount of pressure exerted on the seals 30 by the outer ring 60 may be slight so that the seals 30 properly contain the fluid within the chamber 70 while still enabling the outer ring 60 to rotate.

In one embodiment, it is not necessary to fill the chamber 70 completely with the conductive grease or lubricant. The chamber 70 may only be partially filled. Optimization may be needed for certain applications.

The conductive grease or lubricant can be one of many known to one of skill in the art. For example, the following table includes available conductive greases or lubricants which would be suitable for the bearing of this disclosure:

| Grease/Lubricant Name | Part Number | Provider |
| --- | --- | --- |
| Graphite Lithium Grease | CRC SL3144 | Sta-Lube |
| Graphite Conductive Grease | MZ-21 | American Grease S |
| Carbon Conductive Grease | 846 | MG Chemicals |
| Silver Conductive Grease | 8463 | MG Chemicals |

In one embodiment, conductive lubricant can include a lithium ionic liquid used as a base oil, and polytetrafluoroethylene (PTFE) used as a thickener. Graphite can be used as an additive to enhance the conductivity of the grease. Utilizing a conductive grease or lubricant such as this provides a soft connected grounding device within the bearing to safely ground electrical current therethrough rather than transferring or grounding the current through other bearing elements such as the roller assembly 50.

Figure 3:
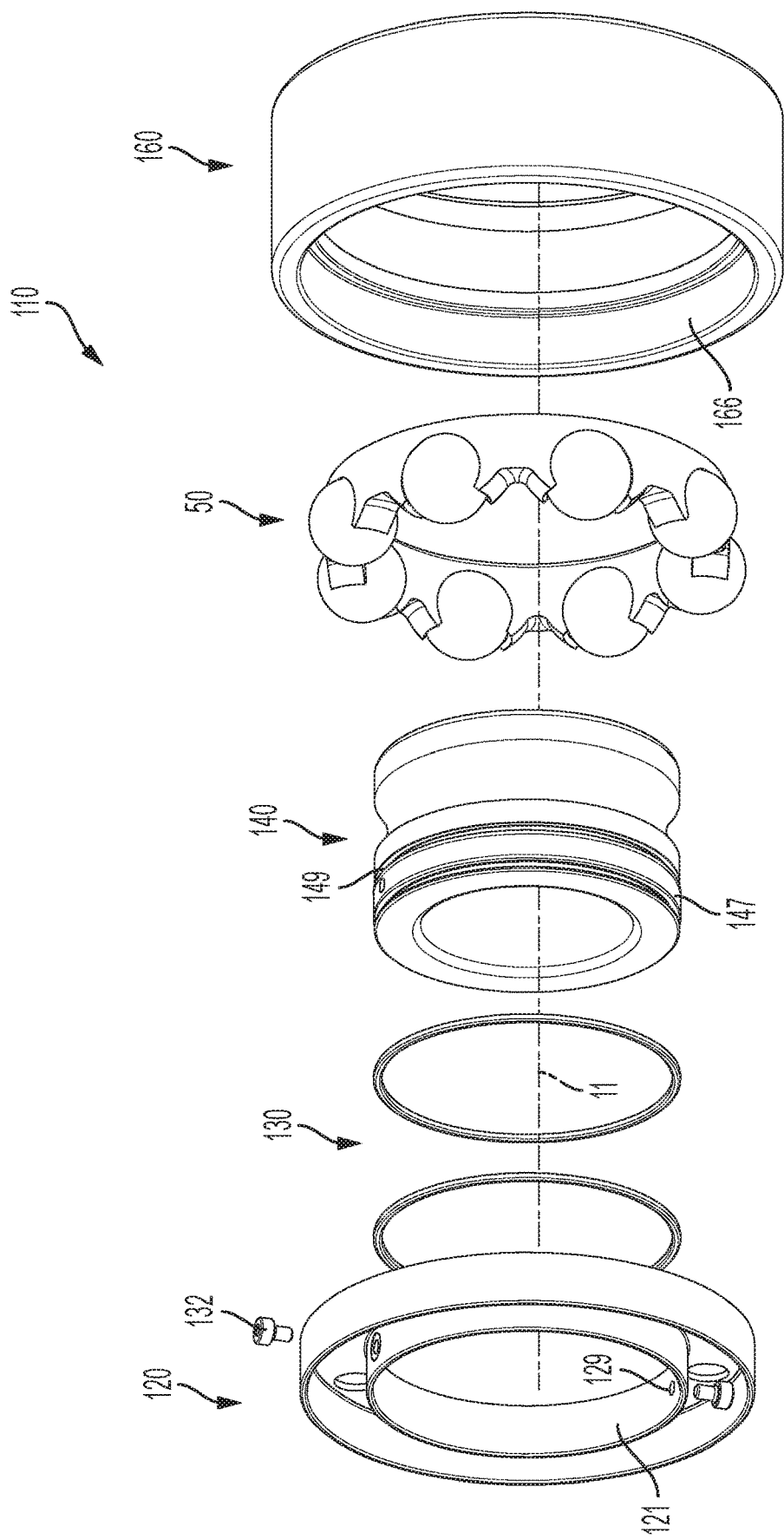
FIG. 3 is an exploded perspective view of a bearing with an integrated soft connected grounding device including an isolated chamber having a conductive fluid therein, according to another embodiment.
Figure 4:
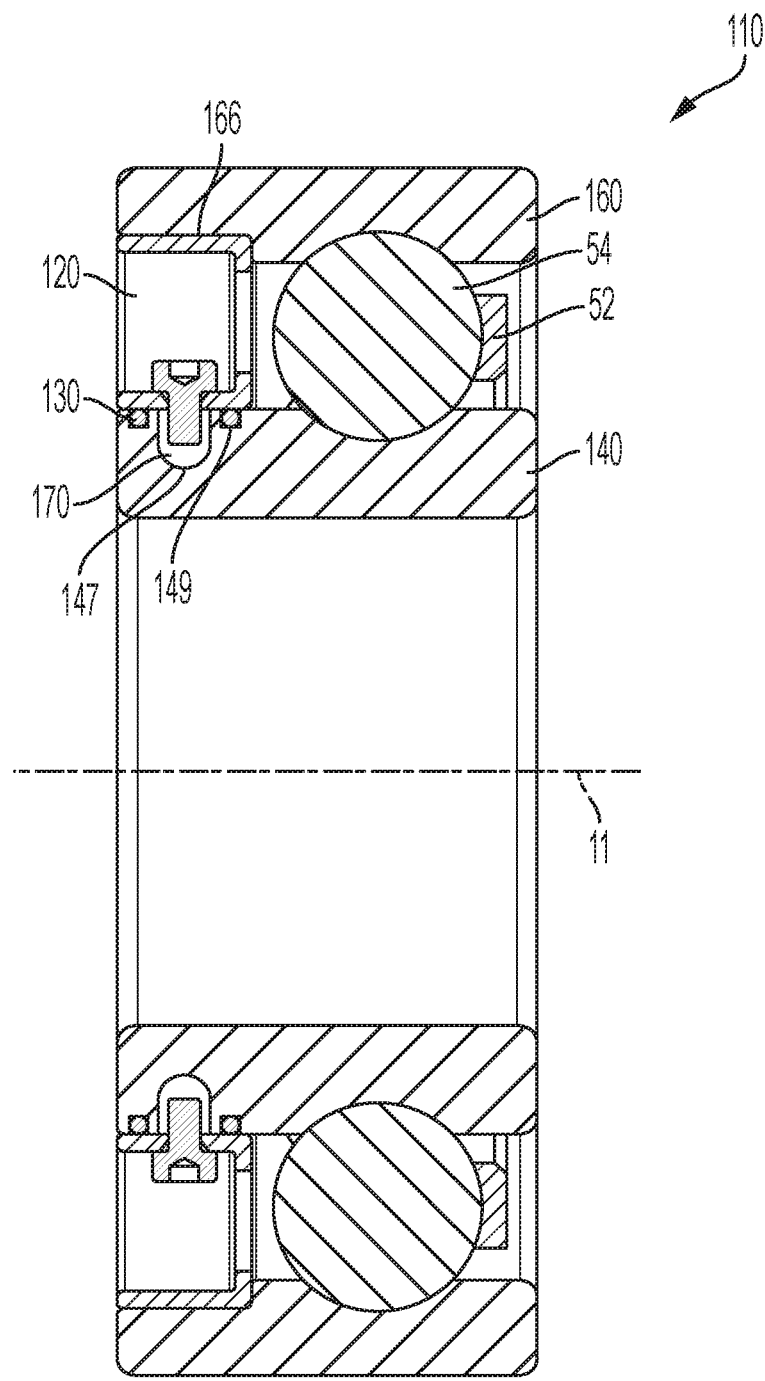
FIG. 4 is a cross-sectional view of the bearing of FIG. 3 in an assembled configuration, according to one embodiment.

FIGS. 3-4 illustrate another embodiment in which the chamber is situated between the connecting ring and the inner ring. In short, compared to the embodiment of FIGS. 1-2, the connecting ring has been modified, the seals are reduced in diameter, the inner ring has an groove to accommodate for the chamber, the outer ring has been modified to remove the groove for the chamber but instead include the shoulder for the connecting ring, and the roller assembly remains identical. Similar components are illustrated with a reference number exceeding by 100 relative to the embodiment of FIGS. 1-2.

Referring to FIGS. 3-4, the connecting ring 120 now has one or more filling holes 129 located about the inner hub 121. Fasteners such as screws 132 close the filling holes 129 to contain the conductive fluid in the chamber 170. The chamber 170 is now situated and bound between the inner hub 121 and the inner ring 140. The inner ring 140 includes a grooved surface defining an annular groove 147 formed in the inner ring 140, flanked by a pair of grooves 149 to accommodate the seals 130. The outer ring 160 now defines a shoulder 166 in its inner surface that contacts an outer surface of the connecting ring 120.

While the rolling elements described herein are balls, the present disclosure is not limited to such an embodiment. The rolling elements may be cylindrical, or any other shape known in the art for roller bearings.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 bearing
11 axis
20 connecting ring
21 inner hub
22 inner surface of hub
23 outer surface of hub
24 axial surface
25 inner surface
26 outer annular member
27 apertures
28 groove
29 filling holes
30 seals
32 screws
40 bearing inner ring
41 inner surface
42 outer surface
44 inner raceway
46 shoulder
50 roller assembly
52 roller cage
54 rolling elements
56 balls
60 bearing outer ring
61 inner surface
62 groove
63 shoulder
64 outer raceway
70 chamber for conductive grease or lubricant
110 bearing
120 connecting ring
121 inner hub
129 filling holes
130 seals
140 bearing inner ring
147 groove
149 grooves
160 bearing outer ring
166 shoulder
170 chamber

What is claimed is:

1. A bearing comprising:
an inner ring defining an inner raceway;
an outer ring defining an outer raceway;
a roller assembly having a plurality of rolling elements contacting the inner raceway and the outer raceway to enable relative rotation between the inner ring and the outer ring;
a connecting ring radially between and contacting the inner ring and the outer ring, wherein the connecting ring is axially spaced from the roller assembly; and
a chamber bound at least partially by the connecting ring, wherein the chamber is at least partially filled with a conductive grease or lubricant to enable electric current to travel between the outer ring and the inner ring at the connecting ring;
wherein one of the outer ring or inner ring has a surface defining an annular groove, the chamber is bound radially between the connecting ring and the surface defining the annular groove, and the conductive grease or lubricant is located in the annular groove; and
wherein the connecting ring includes one or more fill holes providing access to the chamber to enable the filling of the conductive grease or lubricant, and the bearing further comprises one or more fasteners configured to plug the fill holes to keep the conductive grease or lubricant within the chamber.

2. The bearing of claim 1, wherein the chamber is fluidly isolated from a remainder of the bearing to inhibit fluid from entering or exiting the chamber.

3. The bearing of claim 1, wherein the outer ring has an inner surface defining an annular groove, and wherein the chamber is bound radially between the connecting ring and the inner surface and the conductive grease or lubricant is located in the annular groove.

4. The bearing of claim 1, wherein the inner ring has an outer surface defining an annular groove, and wherein the chamber is bound radially between the connecting ring and the outer surface and the conductive grease or lubricant is located in the annular groove.

5. The bearing of claim 1, further comprising a first seal disposed on a first axial side of the chamber and a second seal disposed on a second axial side of the chamber to inhibit the conductive grease or lubricant from exiting the chamber.

6. A bearing comprising:
an inner ring defining an inner raceway;
an outer ring defining an outer raceway;
a plurality of rolling elements contacting the inner raceway and the outer raceway to enable relative rotation between the inner ring and the outer ring;
an isolated fluid chamber containing a conductive grease or lubricant, wherein the conductive grease or lubricant is configured to divert or discharge electrical current traveling through the bearing at a location removed from the rolling elements and the inner and outer raceways; and
a connecting ring disposed radially between the inner ring and the outer ring;
wherein the connecting ring defines one or more filling holes configured to enable the filling of fluid into the isolated fluid chamber.

7. The bearing of claim 6, wherein the outer ring has an inner surface defining a grooved surface, wherein the isolated fluid chamber is bound radially between an outer surface of the connecting ring and the grooved surface.

8. The bearing of claim 7, further comprising a pair of seals disposed on either axial side of the grooved surface to contain the conductive grease or lubricant in the isolated fluid chamber.

9. The bearing of claim 6, wherein the inner ring has an outer surface defining a grooved surface, wherein the isolated fluid chamber is bound radially between an inner surface of the connecting ring and the grooved surface.

10. The bearing of claim 9, further comprising a pair of seals disposed on either axial side of the grooved surface to contain the conductive grease or lubricant in the isolated fluid chamber.

11. The bearing of claim 6, further comprising one or more plugs configured to plug the one or more filling holes to inhibit the conductive grease or lubricant from exiting the isolated fluid chamber through the filling holes.

12. The bearing of claim 11, wherein the one or more plugs are conductive and contact the connecting ring to provide a conductive pathway between the conductive grease or lubricant, the one or more plugs, and the connecting ring.

13. A bearing comprising:
an inner race;
an outer race spaced radially from the inner race;
a groove surface formed into at least one of the inner and outer races;
a connecting ring disposed radially between the inner race and the outer race;
a conductive fluid disposed radially between the connecting ring and the groove surface, wherein the groove surface and the connecting ring cooperate to define an isolated fluid chamber containing the conductive fluid; and
a pair of seals disposed on either axial side of the groove surface and in contact with the connecting ring to inhibit the conductive fluid from exiting the isolated fluid chamber.

14. The bearing of claim 13, further comprising rolling elements disposed radially between the inner race and the outer race, wherein the isolated fluid chamber is axially spaced from the rolling elements.

* * * * *